Jan. 10, 1939. G. M. DARBY Re. 20,971

COMBINED FLOCCULATION AND SEDIMENTATION APPARATUS

Original Filed June 8, 1935 3 Sheets-Sheet 1

INVENTOR.
GEORGE M. DARBY
BY
Arthur Robertson
ATTORNEY.

Jan. 10, 1939. G. M. DARBY Re. 20,971

COMBINED FLOCCULATION AND SEDIMENTATION APPARATUS

Original Filed June 8, 1935 3 Sheets-Sheet 2

INVENTOR.
GEORGE M. DARBY
BY
Arthur Middleton
ATTORNEY.

Jan. 10, 1939. G. M. DARBY Re. 20,971

COMBINED FLOCCULATION AND SEDIMENTATION APPARATUS

Original Filed June 8, 1935 3 Sheets-Sheet 3

INVENTOR.
GEORGE M. DARBY
BY
Arthur Middleton
ATTORNEY.

Reissued Jan. 10, 1939

Re. 20,971

UNITED STATES PATENT OFFICE 20,971

COMBINED FLOCCULATION AND SEDIMENTATION APPARATUS

George M. Darby, Westport, Conn., assignor to The Dorr Company, Inc., New York, N. Y., a corporation of Delaware Original No. 2,095,923, dated October 12, 1937, Serial No. 25,568, June 8, 1935. Application for reissue January 29, 1938, Serial No. 187,699

16 Claims. (Cl. 210—12)

This invention relates to an apparatus for the clarification of liquids containing solid matter held in suspension therein and more particularly to the clarification of relatively dilute suspensions of very fine particles wherein the particles must undergo a process of flocculation or agglomeration before they are economically removable by sedimentation.

It has been found that in the treatment of most dilute liquid suspensions for removal of the suspended solid matters, flocculation of the solids is of paramount importance. This condition is especially true of some of the most important applications of sedimentation such as sewage treatment, clarification of turbid river waters, water softening, etc. Heretofore sedimentation basins have been dimensioned so as to provide within the sedimentation chamber and during the sedimentation operation a sufficient volume and detention to permit the removal of the very finest solids. It has been the prevailing view of those skilled in the art that such volumes or detention are necessary factors in the removal of solids by sedimentation. It has been found that the sedimentation of a particle of fixed diameter and settling characteristics is almost entirely a function of the area of the sedimenting body or basin. On the other hand the turbidity of most turbid waters is composed of particles of such extremely fine size and exhibiting such slow settling ability that economical removal of the matter by sedimentation would be impossible unless another factor were not existent. This is the phenomenon known as flocculation.

Flocculation is the property exhibited by colloids and most fine suspensions of aggregating or gathering together to form much larger bodies or flocs. A more or less commonly accepted theory of the mechanism of the flocculation reaction assumes that colloidal or semi-colloidal solids are kept in suspension by an electric charge carried by the particles and that since this charge is similar on all particles they repel each other and remain dispersed throughout the liquid medium in more or less permanent suspension. In order to destroy this condition it is necessary to neutralize the charges on the particles by the addition of an electrolyte or a colloid of opposite charge. The particles preferentially adsorb either positive or negative ions from dissociation of the dissolved salts. After neutralization of the charge the particles are then free to adhere or coalesce due to the natural attraction of similar bodies. Most commercial suspensions already contain sufficient electrolyte although the resultant intensity of flocculation may vary considerably. In the case of thick pulps and slurries such as encountered in the metallurgical and chemical industries, flocculation is very rapid and a matter of seconds or minutes. In the case of very dilute suspensions, especially those like sewage and like the aluminum hydrate resulting from dosage of water, the time required to reach a degree of flocculation for permitting or aiding sedimentation is of the order of five minutes to three hours or even more.

It has been found that the rate of flocculation is affected to a remarkable degree by the manner in which particles are mechanically brought together, in other words by the character of agitation, and by the amount of contacting and type thereof resulting from the agitation, or as otherwise expressed by the number of impacts of particles with each other. A degree of flocculation which, for instance, would take two hours to be reached under such conditions of quiescence as would ordinarily exist in the usual sedimentation basin may be obtained in five to ten minutes if the flocculation operation were accelerated in or by the use of a properly designed mechanical flocculating means.

It is therefore obvious that mechanical flocculation preceding sedimentation is a very desirable combination and in many cases an essential part of the process. In a sedimentation process or apparatus agitation is obviously highly objectionable in that the slightest turbulence will prevent the desired settling of the suspended particles. The answer would appear therefore to be the division of the operation into two entirely separate stages. This two—entirely separate—stage treatment is now general, or at least quite common, practice in the case of water treatment. In some cases as, for instance, in the treatment of sewage this separate flocculation treatment is too expensive and cumbersome. Furthermore it is all but impossible to move a fluid containing the delicate and fragile flocs without causing some damage to the flocs. In other words, it is difficult to convey the particles from the flocculation apparatus to the sedimentation zone without disintegrating some of the flocs. In fact, it is pointed out that the more violent and sharp the changes in flow direction of the liquid containing the flocs and the more rough the handling of the floc masses, the greater is the detrimental effect upon or disintegration of the flocs or floc structures.

This difficulty can be overcome by locating the flocculation zone and the sedimentation zone in one basin or tank, whereby the floc-laden liquid could be transferred directly to the settling zone, whereby there would be no harmful influence exerted on the flocs. This juxtaposed arrangement has proved feasible and efficient in certain types of equipment such as where the flocculation zone is superposed on the settling zone, as exemplified in the patent to Downes, No. 1,752,789; and in rectangular tanks where the flocculation zone is located in the head end of the settling tank, as exemplified in the patents to Smith, No. 1,893,451, and Darby, No. 2,087,851. But a new problem was presented when such a direct relationship was sought between a flocculation zone and a round clarifier (that is of admitted high clarifying efficiency). Various attempts to solve this problem have been made, but that offered by this invention seems to be the most feasible and satisfactory.

The invention hereof revolves about a novel combined flocculation and sedimentation apparatus; according to which a substantial flocculation of a solid-liquid mixture is carried out during flow of the solid-liquid mixture through the flocculating means; according to which the flocculating means is arranged in respect to the sedimentation basin so that at least an operative portion of the flocculating means is located within or extends into the sedimentation basin and particularly within or into the peripheral confines of the sedimentation zone thereof; and according to which the operative portion of the flocculating means which is within or extends into the sedimentation basin is located above and in vertical spaced relationship with respect to the settling area or bottom of the sedimentation basin and has a relatively unobstructed submerged discharge section leading therefrom thereby providing a constant hydraulic communication by which there is a gentle and free flow or drift by gravity of flocculated liquid from the flocculating means or section directly into the body of liquid undergoing sedimentation; and the general level of the liquid within the flocculating means or section is substantially that of the liquid within the sedimentation zone except for the slight differential head incident to the gravity flow from the flocculating means or section into the sedimentation zone. In this arrangement the discharge from the flocculating means or section is at a location over or above the settling area or bottom of the sedimentation basin and also at a location sufficiently spaced from the effluent launder construction with which the sedimentation basin is provided to permit of a consequent substantial sedimentation of the flocculated liquid thus relatively unobstructedly delivered from the flocculating means or section into the body of liquid undergoing sedimentation.

A main object of this invention is to provide a combined flocculation and sedimentation unit—a unitary arrangement—wherein the efficiency of the combination is better than that of either one alone. In particular it is proposed to place the flocculating unit in effect within an upper section of the sedimentation chamber so that a part of the volume of the sedimentation chamber is utilized without detrimentally affecting or reducing the functioning of the settling or sedimentation zone.

The unitary arrangement just mentioned is realized according to one form or embodiment of the invention in or by a single tank or basin divided by a partial partitioning means into horizontally-concentric inner and outer zones that are in constant hydraulic communication with each other whereby the normal level of the liquid within the tank determines the normal level within and common to said zones and of which zones the inner one preferably serves as the flocculation space or compartment while the outer zone serves as the sedimentation space or compartment.

A further object is to so arrange the flocculating or flocculation compartment so that the discharge therefrom, namely, the flocculated feed, is introduced directly into the sedimentation chamber at an optimum point for efficient sedimentation.

A still further object is to provide an arrangement that permits a relatively free, easy, gentle and unobstructed direct flow or drift from the flocculating compartment or zone into the sedimentation compartment or zone and in a manner whereby breakage or damage to the flocs in passing from the flocculation zone to the sedimentation zone is largely or wholly prevented.

More particularly, this invention according to one phase thereof may be said to emphasize the horizontally-concentric location of a flocculation zone within a round sedimentation tank (or one that is substantially round) equipped with sediment-impelling rakes that are rotatable about a vertical axis, and wherein the liquid to be treated is initially fed to the flocculation zone. The flocculation zone is characterized in that it yields integrated flocs conditioned for settleability resulting from the use in that zone of current-producing mechanism having an assembly of blades moving in repetitive paths extending from a center of motion. The flocculation zone should be fed from beneath the liquid level in the sedimentation tank, such as by means of an inverted siphon or U-shaped feed pipe. More particularly, the invention—according to the phase thereof under immediate discussion—resides in the structures herein proposed for use; their co-operative relationships; and the steps of treatment carried out by them.

One manner of carrying out this phase of the invention is to supply liquid from which suspended solids are to be removed or recovered, to the herein-proposed flocculating clarifier combination, through a pipe or conduit that passes from outside of the combination apparatus beneath the liquid level in the tank thereof and, indeed, preferably beneath the floor of the tank, to a centrally-located flocculation zone that is encircled by but functionally-separated from a surrounding sedimentation zone equipped with travelling rakes for impelling sediment to discharge or withdrawal from the tank. The tank is provided with an outflow for effluent of clarified liquid.

The flocculation zone is provided with agitative means adapted to cause a multitude of collisions between suspended solids and other particles of turbidity in the liquid under such conditions of agitation as to be conducive to the agglomeration and coagmentation or amassment of the suspended solids into flocs of settleable size and density. That is, floc nuclei are caused to meander around in the liquid of the flocculation zone for the purpose of colliding with other flocs and solids to produce large colonies of flocs and solids. Further motion of these tends to roll them up or otherwise make them dense. As they increase in size and density their settleability tends to increase, and, indeed, they start downwardly in settlement, but the agitative means used are such that settling flocs are disturbed in their settling and again caused to meander through the liquid.

Flocs ultimately grow until the agitative means no longer sweeps them back into circulation, whereupon they descend to a point where they and their carrying-liquid vehicle flow or drift from the flocculation zone directly to the encircling sedimentation zone under conditions whereby they are not disintegrated and whereby the agitation existing in the flocculation zone does not reach into the sedimentation zone to harmfully disturb the necessary quiescence therein. To that end a feedwell drum or partial partitioning means is provided between the flocculation and sedimentation zones arranged for the transfer of floc-laden liquid to the sedimentation zone, but for preventing the agitative effects existing in the flocculation zone from extending into the surrounding sedimentation zone. A central pier or pedestal is preferably provided that affords support for the feed-well and the travelling sediment-impelling rakes and also for the motivating mechanism therefor. The pier can well be made hollow to the extent of permitting the incoming feed of liquid to pass into the flocculating zone from the pier. For agitative devices, rotating paddles have been found to be highly satisfactory in effecting the coagmentation of the flocs into settleable condition. The rotating paddles are arranged to be carried or supported from the feed-well. Such a device is adapted for continuous operation and is well adapted to treat liquid-bearing organic solids that go septic on standing (such as sewage), particularly since sediment is continually mechanically removed from the floor of the sedimentation zone and also since no substantial quantity thereof accumulates on the floor of the flocculation zone because the agitative devices are designed to sweep them either back into suspension, or out from the flocculation zone into the sedimentation zone. Details of construction described hereinafter are important but need not be referred to in this general statement about the practicing of the invention.

The invention possesses other objects and features of advantage, some of which with the foregoing will be set forth in the following description. In the following description and in the claims, parts will be identified by specific means for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings.

The means and arrangement by which the objects hereof are accomplished and realized will be made clear by a study and consideration of the accompanying drawings which constitute a part of this specification. In said drawings:—

Figs. 1, 2 and 3 illustrate one form or arrangement of apparatus incorporating features herein outlined as important or essential; Fig. 1 being a plan view partially broken away; Fig. 2 being a vertical sectional view taken as on the vertically extending plane indicated by the line 2—2 of Fig. 1 looking in the direction of the arrows; and Fig. 3 being a sectional view of a detail or portion of the apparatus taken as on the vertically extending plane indicated by the line 3—3 of Figs. 1 and 2 looking in the direction of the arrows.

Fig. 4 being a plan view, and Fig. 5 being a vertical sectional view taken as on the vertically extending plane indicated by the line 5—5 of Fig. 4 looking in the direction of the arrows.

Fig. 6 being a plan view, and Fig. 7 being a vertical sectional view taken as on the vertically extending plane indicated by the line 7—7 of Fig. 6 looking in the direction of the arrows.

Figure 1:
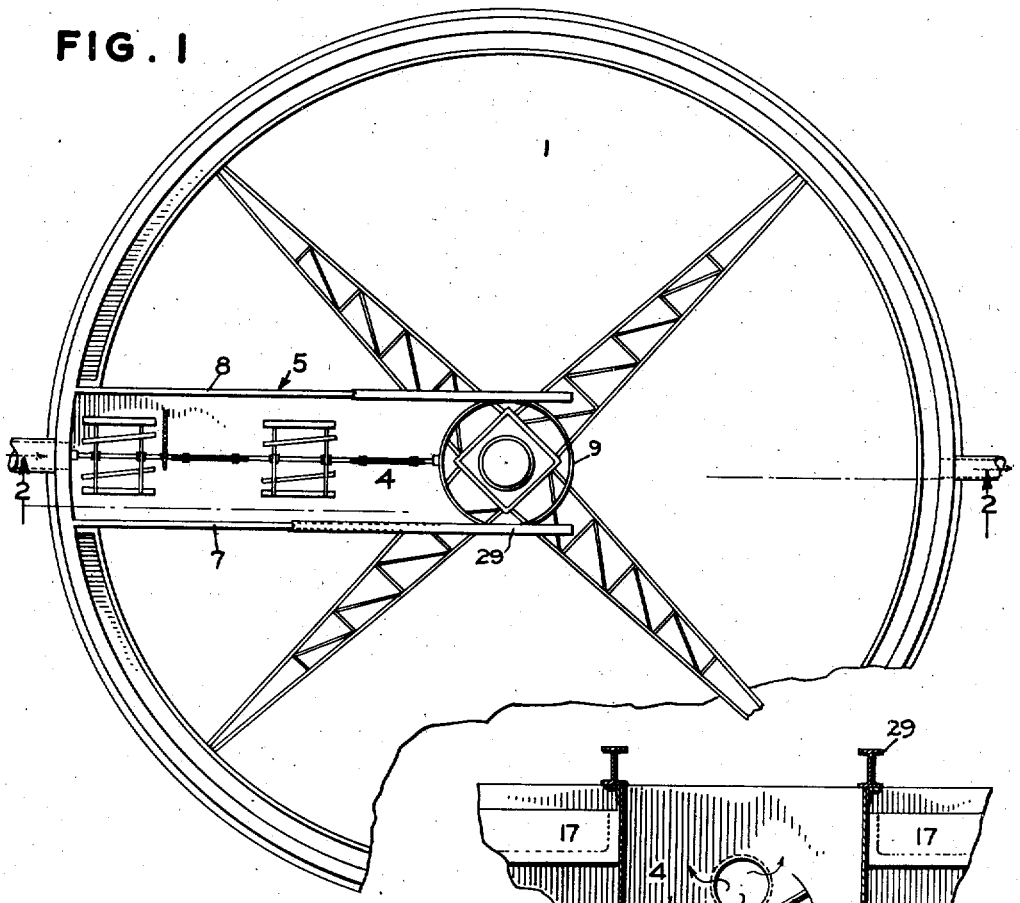

Reference will now be made to the drawings in detail. Wherever employed the same reference character designates like or equivalent functioning parts even though in the different arrangements illustrated certain of the parts thus designated by a reference common thereto may be of different forms or embodiments thereof.

Figure 3:
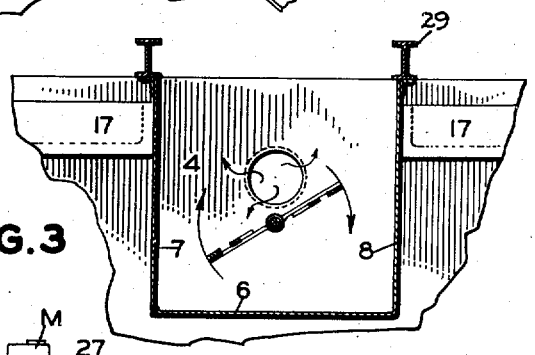
Figure 2:
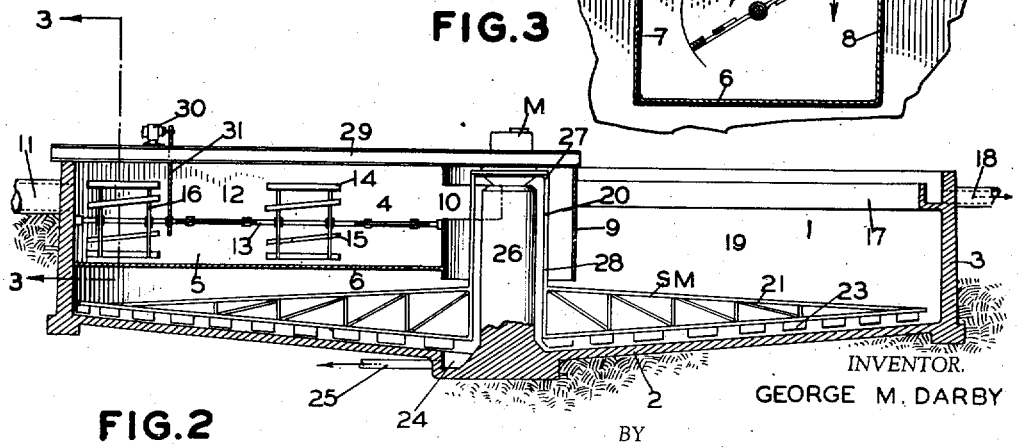

The apparatus of Figs. 1, 2 and 3 includes a sedimentation tank or basin 1 having a slightly inverted conical bottom 2 from which there upwardly extends a cylindrical perpiheral or boundary wall 3. It is to be noted, however, that in the realizing of the invention it is not necessary that the boundary wall be cylindrical, as other forms of tank construction can be employed.

Part of this sedimentation tank or basin is partitioned off as or so as to provide a flocculation space or zone 4. This partition is obtained by the employment of a trough construction 5 having a bottom 6 and upwardly extending side walls 7 and 8 within which there is provided the flocculation zone or space 4 which may be referred to as a flocculation or flocculating compartment.

The trough 5 essentially providing the compartment, extends to and in effect terminates in a centrally located cylindrical section or member 9—sometimes referred to as the feedwell—open at the bottom and having a relatively large unobstructed opening 10 that provides a relatively unobstructed discharge opening, passageway or section leading from the flocculation compartment 4 on the one hand to the interior of the cylindrical section 9 on the other hand. From another point of view, the structural arrangement of the parts which provides this discharge opening 10 and the central feedwell construction may be considered as defining a discharge section or portion of or for the trough construction whereby a relatively ready, easy and unobstructed flow of liquid containing flocs in suspension therein can pass directly from the flocculating means, zone or section to and into the sedimenting zone, space or section 19 of the sedimentation basin or tank 1.

The members constituting the trough 5 may be viewed as providing a flocculation chamber structure which is partially submerged, and is located in a manner whereby the bottom or bottom member 6 thereof directly overlies a section of the bottom of the tank. This bottom 6 occupies a vertically spaced position in respect to the bottom section overlain thereby and it is also positioned substantially below the level of the body of liquid undergoing sedimentation, to wit; the normal level of the liquid as determined by the effluent launder 17 hereinafter referred to. The upwardly extending side walls 7 and 8 of the trough or flocculation chamber structure extend from the bottom 6 upwardly in a manner whereby the upper edge portions thereof are above the normal level of the liquid undergoing sedimentation.

It will be noted that a flocculation zone is provided which is functionally distinct and separate from the sedimentation zone except through the medium of a definite discharge or discharge section whereby hydraulic communication continually exists between the flocculation zone and the sedimentation zone thereby permitting not only easy and ready drift and free flow from the flocculation zone into the sedimentation zone but also insuring the maintenance of a common level for and as between liquid in each and which may be considered in effect as extending from one zone to the other.

The arrangement of the flocculation chamber structure in respect to the sedimentation tank structure is also such as to readily permit sedimentation to take place below the flocculation chamber structure as well as in the space around or about it. Moreover, the vertically spaced relationship of the bottom member 6 above the corresponding section of the tank bottom directly below it permits the passage and movement of arms of the raking structure whereby the underlying sections of the tank bottom as well as the other section of the tank bottom can be properly raked for the removal of the sedimented material.

A pipe or conduit 11 serves as an influent supply or feeding means by which a chemically dosed liquid containing solids in suspension therein, to wit, a liquid-solids mixture such as sewage, is passed into the flocculating means or section of the apparatus, namely, into the flocculation compartment or zone 4. In this compartment 4 there is means, broadly designated as 12, for effecting a gentle but positive agitation of the liquid-solids mixture as it flows along the trough on its passage from the receiving section thereof as defined by the influent feed 11 on the one hand, to the discharge portion or section thereof as defined by the discharge opening 10 on the other hand.

The agitating means 12 just referred to is satisfactorily provided by the horizontally and radially extending shaft 13 from and by which there are carried paddles as 14 and 15 through the medium of the arms or arm constructions 16 which are directly mounted on the shaft.

The sedimentation tank or basin 1 has an effluent outlet or outflow means provided by a peripherally extending launder trough 17 and an outflow or effluent launder pipe or conduit 18. The trough 17 is located at the upper interior portion of the tank and defines the normal upper level for the liquid-solids mixture within the tank, as is usual in connection with the operation of sedimentation basins. It will be noted that the level of the liquid-solids mixture in the flocculating zone or compartment 4 and that of the liquid-solids mixture in the sedimentation zone or compartment 19, are practically the same—being exactly the same except for the slight differential in head incident to the free flow of liquid from the influent or feed pipe 11 through the flocculating zone or compartment 4, the unobstructed discharge opening 10, the interior of the open bottom cylindrical section 9 through the sedimentation compartment 19 to and into the trough of the effluent launder 17.

It will also be noted that the shaft 13 is substantially submerged to a sufficient depth whereby the paddles 14 as they are rotated practically remain in continuous submergence.

It will further be noted, as previously indicated, that the liquid-solids mixture after being subjected to the flocculation operation in the compartment 4 has an easy, quiet and gentle flow therefrom and, in effect, directly into the sedimentation zone or compartment 19; also that immediately upon the liquid containing the flocculated material in suspension therein passing the lowermost edges of the feedwell 9 there is a flow in any easy manner and at a gradually decreasing rate towards the effluent launder 17 until the supernatant leaves as a relatively clear effluent. The delivery of the liquid-solids mixture from the lower portion of the cylindrical section 9 is, however, above the lowermost interior section of the sedimentation tank, the lower portions of which sedimentation tank or basin are traversed by a sludge collecting and transferring mechanism broadly designated SM and which includes a rotatable central structure or arm carrying section 20, arms 21 radially extending therefrom, and raking blades or scrapers 23 in turn carried by the arms.

This sludge collecting and scraping mechanism preferably but not necessarily embodies the essential features and mode of operation of what is known as the Dorr type of sludge raking and scraping mechanism, and functions to rake and collect settled solids such as sewage sludge from diverse sections of the bottom or sedimenting area of the sedimentation tank or basin 1 to and into a centrally located sump hopper or sludge discharge section 24 from which the solids thus conveyed thereto are ultimately hydraulically withdrawn or passed through and by the means of the sludge withdrawal conduit or pipe 25.

In the construction shown, a centrally located hollow fixed structure or pier is upstanding in the tank 1 indicated at 26. Thereupon there is rotatably mounted a carrying ring or annular rotatable frame member 27 from which and by which there is carried a depending rotatable or supported structure 28, and from the latter of which there are carried rotatable or supported the arms 21 heretofore referred to. The parts 27 and 28 are elements of the rotatable carrying structure heretofore described and referred to as part 20.

The sludge scraping mechanism SM is caused to rotate in any suitable manner as through the medium of a motor M carried by the central pier 26 and suitable speed reducing mechanism, not shown, between the motor M on the one hand and the rotatable frame member or carrying ring 27 on the other hand whereby, incident to the operating of the motor the sludge raking mechanism can be caused to rotate. It will be here noted that the sludge rakes or blades 23 are inclined or angularly disposed in respect to their path of travel in such a manner that incident to the rotating of the sludge raking mechanism SM about its vertical axis there follows a progressive forward and inward impelling or ploughing of the sedimented solids until they are ultimately passed to and into the sludge receiving hopper or sump 24. From and by means of the central pier 26 there may be carried the inner end portions of a beam or framework construction 29, the outer end portion of which is supported on and by the upstanding peripherial wall 3 of the tank. It is feasible to utilize this beam construction 29 as part of the means for affording support to the motor M and the speed reducing gearing heretofore referred to.

A motor 30 is carried by this beam or framework construction 29 and, through the medium of a gear and chain construction 31, serves to drive the paddle carrying shaft 13. It is to be noted that a sufficient speed reduction is necessary between the motor 30 on the one hand and the shaft 13 on the other hand, so that only a slow movement will be imparted to the paddles 14 and 15 whereby only gentle agitative effects will be imparted by the paddles to and upon the liquid-solids mixture being subjected to flocculation while flowing through the flocculation zone or compartment 4.

Fig. 3 has been incorporated in order to more clearly bring out and show the relationship of the general level of the liquid undergoing flocculation in respect to the effluent launders of the sedimentation portion of the apparatus, and also to show the position of the flocculating paddles in respect to the liquid-solids mixture upon which they operate.

The beam construction 29 may be referred to as a truss or girder construction, and it serves to support the central cylindrical section or feedwell 9, and also the inner end of the trough construction 5 of which the cylindrical or feedwell 9 construction may be considered as constituting a part.

In operation the liquid to be clarified which has already had a chemical coagulant mixed therewith enters at 11, is subjected to gentle coagmenting agitation that is non-dispersive by the paddle mechanism that includes the shaft 13 and the paddles 14 and 15 while flowing through the flocculating zone or compartment 4. After a suitable detention within this flocculating zone or compartment 4, during which the desired degree of flocculation is obtained, the desired degree of floc coagmentation or floc building up and floc amassment into floc colonies, the liquid with the flocculated material suspended therein, gently flows or drifts through the relatively unobstructed discharge opening 10 into the centrally located cylindrical section or feedwell 9 which may function as a stilling and distributing well. Therefrom the liquid-solids mixture flows gently out of the bottom of the well and distributes itself over the entire area of the basin. The heavier solid particles settle to the bottom of the sedimentation chamber and from time to time they are swept, collected and transferred by the scrapers or blades 23 which are inclined to their forward path of movement in a manner to effect the ultimate transfer of the solids collected and transferred thereby to and into the discharge section or sump 24 from which they are hydraulically withdrawn through the medium of the pipe 25. The relatively clarified effluent, as previously pointed out, overflows into the launder 17 and thence through the conduit 18 from the apparatus.

The apparatus of Figs. 4 and 5 embodies substantially the essential features above described in connection with the arrangement of Figs. 1, 2 and 3, but in the arrangement of Figs. 4 and 5 a slight change has been embodied in the fluocculator construction.

According to this latter arrangement, there is employed a series of shafts 32, 33 and 34. These shafts are substantially submerged. They extend horizontally and at right angles to a radial line or, in other words, at right angles to the general flow path for the liquid-solids mixture undergoing flocculation. These shafts, through the medium of a suitable arm construction as 35, carry flocculation paddles 36, all of which rotate in the same general direction. A motor 38, through the medium of suitable speed reducing sprocket and chain gearing broadly designated as 39, serves to operate the paddles which will be an aid because of the gentle agitative effect thereof in furthering the flocculation operation carried out on the liquid-solids mixture as it flows from the influent feed 11 ultimately through the unobstructed discharge opening 10, thence into and from the distributing or feedwell 9.

Figure 4:
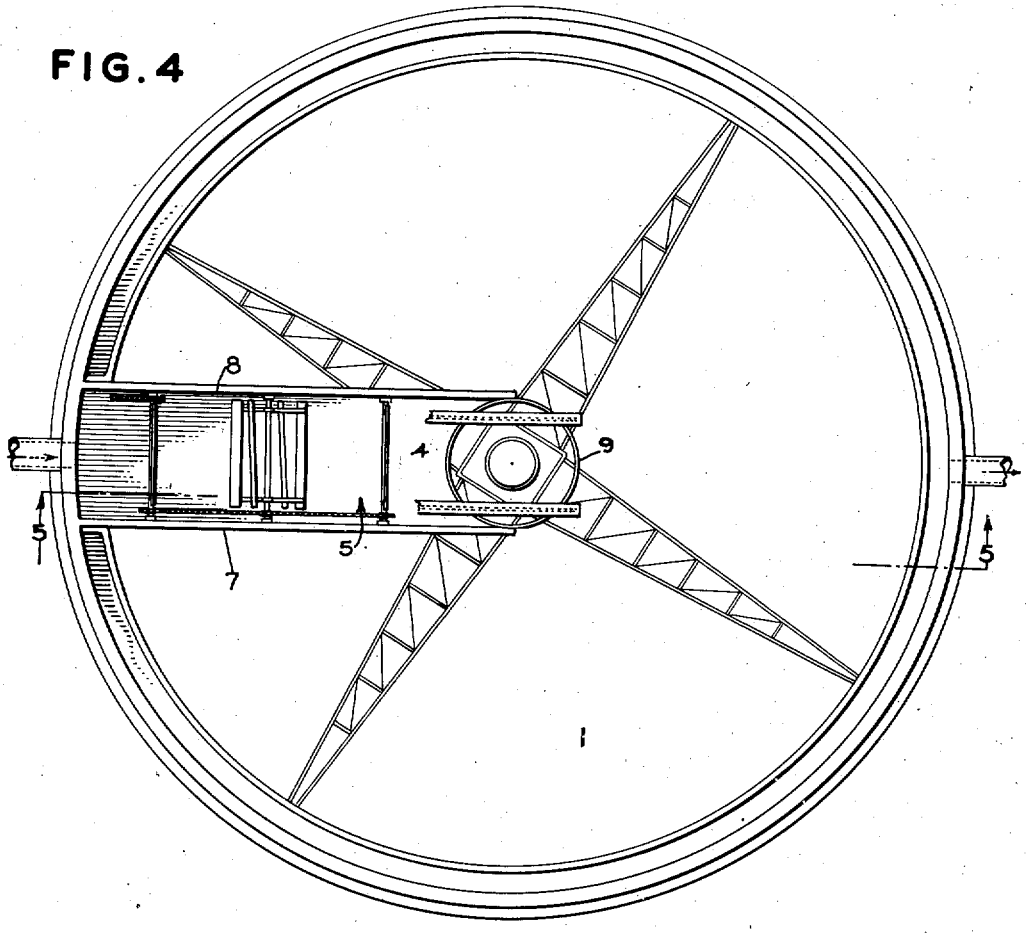
Figs. 4 and 5 illustrate another form or arrangement of apparatus incorporating features described herein as important or essential.
Figure 5:
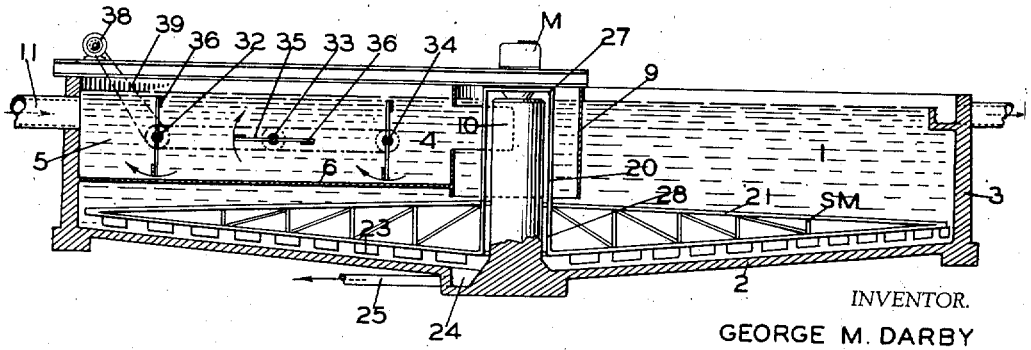

Otherwise as indicated, the apparatus of Figs. 4 and 5 functions exactly as the apparatus of Figs. 1, 2 and 3.

Figure 6:
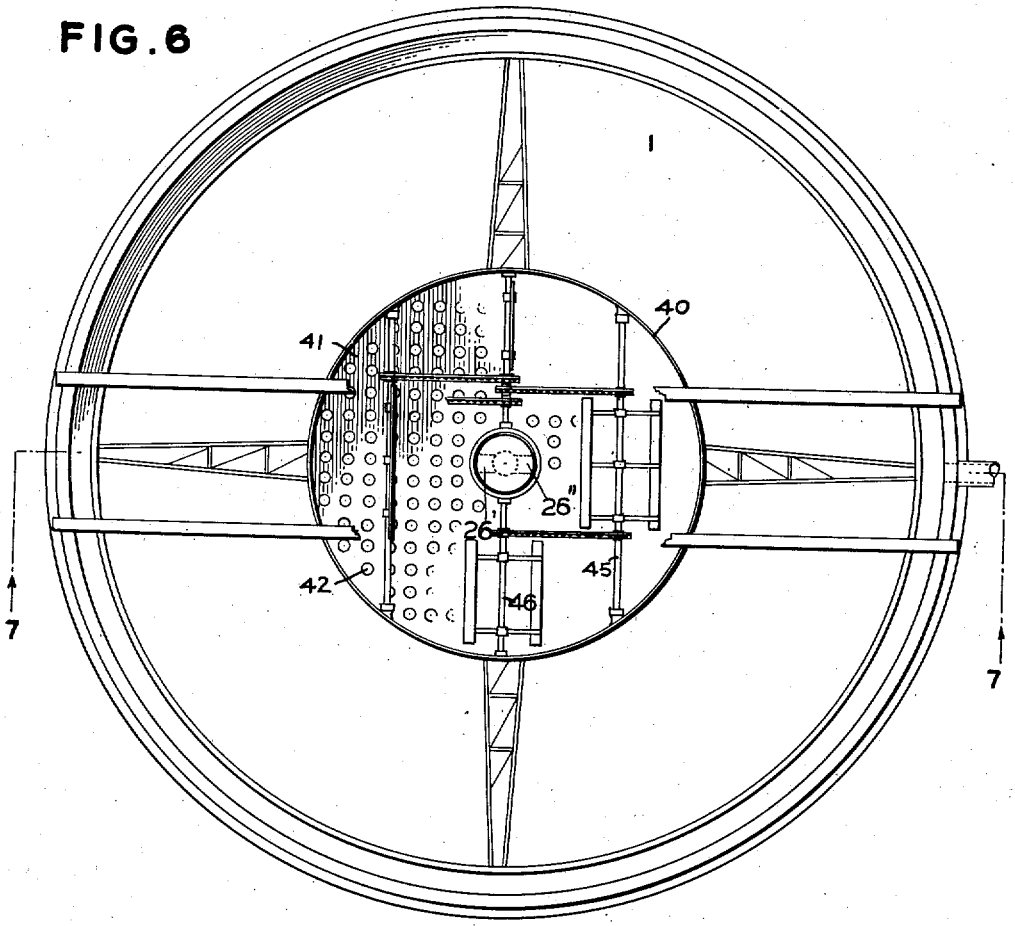
Figs. 6 and 7 illustrate still another form or arrangement of apparatus incorporating features described herein as important or essential.
Figure 7:
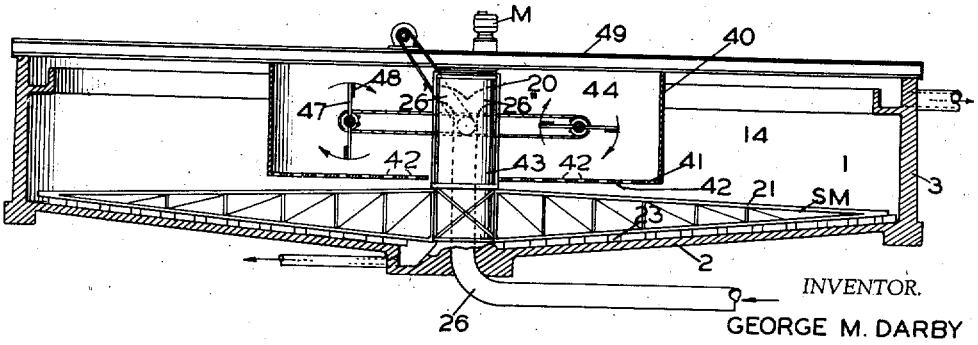

The apparatus of Figs. 6 and 7 indicates a still further variation or arrangement that embodies certain essential features of the invention.

According to this arrangement, the flocculating compartment and the centrally located feedwell are identical, and are provided within and by a cylindrical centrally located liquid-surrounded drum or shell 40 having a bottom section 41 with openings or discharge apertures 42. The centrally located drum or shell 40 and the bottom 41 provide a flocculating chamber therein and may be referred to as a liquid-surrounded partially submerged flocculation structure the partition or wall 40 of which extends upwardly a short distance above the normal level of the liquid within the sedimentation tank as determined by the effluent launder thereof. The bottom 41 of this structure directly overlies to a substantial extent a section of the sedimentation tank bottom 2, it is vertically spaced from and above the section of the tank bottom overlain thereby, whereby the necessary space is provided within, along or through which the rake carrying arms of the settled solids raking mechanism can travel and function. This bottom 41 of the flocculation chamber structure is substantially below the normal or general level of the liquid within the sedimentation tank with the result that a desired flocculation zone having substantial extent within the sedimentation tank is realized. The openings 42 in the bottom 41 collectively provide the necessary and desired hydraulic communication or submerged discharge between the flocculation zone and the sedimentation zone whereby the desired free flow and drift of liquid with flocculated material suspended therein can pass from the flocculation zone into the sedimentation zone and whereby the normal or general level of the liquid in said zones is substantially the same because of said bodies of liquid in effect constituting a single body of liquid even though the flocculation zone and the sedimentation zone are effectively functionally separated. The sedimentation tank or basin 1 has a centrally located fixed pier 43 that extends upwardly from the bottom 2 thereof. This upwardly extending pier section 43 has rotatably mounted at the upper portion thereof the rotatable carrying structure 20 from and by which there are carried the arms 21 of the sludge raking mechanism SM whereby, when said sludge raking mechanism is caused to rotate by the motor M, there can be effected the collecting and transferring of settled solids in the manner previously described in connection with the other arrangements.

This centrally located fixed pier 43 is hollow and provides therein the upwardly extending terminal arm of an inverted siphon feed construction, the terminus of which has branches 26′ and 26″ by which the incoming feed is delivered in a general upward direction into a flocculation space or zone that is provided within the cylindrical section or shell 40 and above the perforated floor or bottom 41. The flocculating space or zone just referred to is designated as 44.

Within this flocculating zone or space there are also located submerged horizontally extending paddle carrying shafts 45 and 46 preferably supported from the partition 40. The shafts are here shown as parallel to each other. Each of these shafts supports arm constructions such as 47 that carry paddles 48. The hollow part of the pier and the feed-conduit pipe 26 may be viewed as constituting the influent supply means leading to the inner flocculation zone provided within the tank.

An inspection of these figures will make it clear that the incoming liquid-solids mixture as fed by or delivered from the ports or discharge openings of the ported section that provide the conduit sections 26′ and 26″ of the bore 50 of the center pier 43, will naturally spread throughout the entire section of the flocculating compartment 44, and that the paddles will effect a relatively efficient but gentle agitation of the entire body of solids-liquid mixture therein. After a due period of detention there is a relatively easy, quiet and gentle flow of the liquid containing flocculated solids through the openings of the bottom aperture plate or member 41.

The centrally located partition 40 has been described as being cylindrical. It is to be noted, however, that this may be even square or of an intermediate shape such as hexagonal.

The openings 42 in the bottom plate portion 41 may be viewed as collectively constituting or providing a total submerged discharge area or passageway leading from the flocculation zone directly into the surrounding outwardly-disposed sedimentation zone and through which said zones are in constant hydraulic communication with each other whereby incident to a feed of incoming liquid into the flocculation zone there is a consequent free flowing and drifting of displaced liquid with flocs suspended therein from the lower portion of the flocculation zone into the sedimentation zone and a consequent overflow of a corresponding quantity of displaced supernatant liquid over the marginal weir portion of the peripheral launder trough 17 into the liquid-receiving and conducting section of the trough. The peripheral trough 17 and the pipe 18 leading therefrom collectively constitute a liquid outflow means leading from the sedimentation zone, and the weir or upstanding lip portion of the trough functions whereby the liquid outflow means determines the normal level of the body of liquid within the tank.

The hollow pier of the construction illustrated constitutes as already pointed out an upflow delivery section of an influent supply means; the upflow delivery section terminates in submergedly-disposed discharge ports provided in or by the ported sections. The incoming liquid is emitted from these submerged discharge ports so as to have an upflow delivery direction into the liquid-holding or liquid-retaining section of the inner flocculation zone. The port openings are therefore preferably at an elevation or elevations lower than that of the normal level of the liquid within the tank as said level is normally determined by the overflow weir of the peripheral launder trough 17. The pier may be viewed as a hollow structure or means rising from the bottom of the tank and as providing a means by or from which the horizontally-turnable or travelling mechanism SM is operatively supported. The raking mechanism or sediment-impelling assemblage SM comprises the heretofore mentioned rotatably-mounted carrying ring or frame member 27, the arm-carrying structure 28 depending therefrom and the rake arms 21 extending from the lower portion of the arm-carrying structure and in turn carrying or embodying sludge-engaging and impelling elements which function incident to the turning of the arm-carrying structure about the pier, or as otherwise expressed, incident to the turning of said arm-carrying structure about the vertically-extending axis common to the concentric inner and outer zones.

The blades or paddles 48 are formed into one or more assemblies and are in effect current-producing devices moving repetitively in closed paths from an axis of movement and are for integrating the flocs and conditioning them for settleability. The blades as shown herein extend horizontally and constitute bladed elements preferably arranged for functioning as sets within the flocculation zone 44. The blades or paddles are bodily movable in paths offset with respect to the vertically-extending axis that is common to the horizontally-concentric tank sections, or as otherwise expressed, the blades or paddles are disposed so as to be movable in paths non-concentric with respect to the horizontally-concentric tank sections.

The blades or paddles 48 as carried from the horizontally-extending shaft 45 or 46, as the case may be, have bodily movement in paths whose centers of motion are horizontally disposed. The bodily operative movement of the blades or paddles 48 in the liquid within the inner or flocculation zone are in directions transverse the length of the blades. The paddles or bladed means 48 may be described as functioning in the space between the axis of the concentric sections and the interior of the partitioning wall 40 that constitutes an apertured structure disposed intermediate of the pier and the main tank structure. They may be referred to as functioning within the liquid retained within the flocculation zone between the pier or the depending arm-carrying structure on the one hand and the interior of the intermediate wall or partition 40 on the other hand. The horizontally-extending paddle-carrying shafts may be supported in any suitable manner. In the construction shown these shafts derive support either in whole or in part from the intermediate partition provided by the annular wall. The paddles 48 of the different sets parallel each other.

As to the more specific arrangement, it will be noted that the sets of paddles are horizontally-spaced and are arranged so that the paddles constituting one set are disposed at one side of the pier, or at one side of the rotatable arm-carrying structure which is turnably mounted upon the pier, while paddles of another set are disposed at an opposite side of the pier, or at the opposite side of the rotatable arm-carrying structure. In other words, these sets of paddles are disposed in different portions of the flocculation space.

In order that the agitative movements which are imparted to the liquid within the inner flocculation zone shall not unduly extend into the outer or sedimentation zone the upper margin of the intermediate wall or partition 40 is at an elevation somewhat above the normal level of the liquid within the tank as determined by the overflow weir, or as otherwise expressed, as determined by the liquid outflow means leading from the sedimentation zone.

The cylindrical partition 40 is supported in any suitable manner as by the beam or truss construction broadly designated by 49 and which derives support from the boundary walls of the sedimentation unit, but it may also derive support if desired from the central pier construction.

In all of the arrangements described it is to be noted that there is in fact a flocculation trough or flocculation chamber structure wherein the normal level of the liquid-solids mixture undergoing flocculation is substantially that of the liquid-solids mixture undergoing sedimentation within the larger sedimentation area; that this flocculation space is located within or at least extends within the sedimentation zone or area as defined by the peripheral or boundary walls of the sedimentation tank or basin; that each of the flocculation troughs or chambers has a bottom or delivery section which is substantially below the normal level of the body of liquid undergoing sedimentation as defined and determined by the effluent launder construction; and that the lowermost area or edge of the discharge portion or of the discharge openings of the flocculation apparatus—while substantially below the level as determined by the effluent launder—is somewhat above the area or zone wherein the scraping of the sedimented solids is effected by and because of the functioning of the scrapers or blades 23, which may be referred to and are referred to as the essential scraping elements of the scraping mechanism SM. It will also be noted that in the constructions as shown, portions of the raking mechanism extend under and operate in the space that is located under certain portions of the flocculator construction.

The portions of the apparatus constituting what may be referred to as a flocculation trough or flocculation chamber structure may be viewed as a part of the influent supply means by which the liquid solids mixture to be subjected to sedimentation is introduced and ultimately delivered into the sedimentation zone of the sedimentation tank.

It has been briefly mentioned before that sedimentation is a function almost entirely of area. By available settling area is meant the maximum horizontal cross-section of the sedimenting fluid body. In this proposed device the fact that part of the volume of the tank or basin is set aside for flocculation and feed distributing purposes does not reduce or affect in any way the available settling area and therefore the strictly sedimentation capacity of the unit. All of the cross-sectional area of the basin is still available and will be utilized for settling. As was pointed out before, the volume and therefore the depth of the sedimentation device is of no appreciable importance provided the feed is already properly flocculated.

By the arrangements indicated in this invention, part of the otherwise useless volume or depth of the tank is set aside for flocculation purposes and provided with mechanical agitating means which greatly accelerate the processes of flocculation. In other words, the volume of the sedimentation basin which would normally be used merely for flocculation purposes under quiescent conditions is converted to use for flocculation under mechanically induced and accelerated conditions. It therefore follows that the flocculating efficiency of the flocculating compartment is just as great as it would be if it were a separate unit, and the sedimentation efficiency and incidental flocculating efficiency of the complete basin is just as great as or greater than it would be if part of it were not so utilized. The result is that a combination unit is obtained having maximum flocculation and sedimentation efficiency.

By locating the flocculating device immediately within the sedimentation zone, the flocs move or flow from one zone into the other without any appreciable restriction or change in velocity and therefore are not subject to disruptive forces. This is a very important feature of this device as it is my experience that almost all other possible combinations of flocculating means or units and sedimentation units cause objectionable restriction, changes of velocity, and changes in direction of flow which are detrimental to the floc structure.

It may also be noted that the specific arrangements indicated provide for the introduction of the flocculated feed at the point or location providing the optimum sedimentation conditions. By this is meant that the feed is introduced near the bottom of the basin and at a point remote and equi-distant from the point or points of effluent discharge. Also that the feed is introduced quietly and is efficiently distributed.

According to the broadest aspects of the invention, it is directed to an associated flocculation and sedimentation apparatus constituting a unit in which the level of the liquid within the flocculator is substantially the level of the liquid within the sedimentation unit and in which the flocculating unit has a discharge section which provides a relatively free, easy and unobstructed flow of liquid which has undergone flocculation treatment and which has flocculated material suspended therein from the flocculation zone into the sedimentation zone and in a manner to avoid any substantial disrupting or breaking down of the formed flocs which have resulted from the carrying out of the flocculation operation therein.

According to the specific embodiments of the invention as shown, and also according to the preferred embodiments thereof, the flocculating means is arranged with respect to the sedimentation basin so that an operative portion of the flocculating means is located within or extends substantially into the sedimentation basin. However, according to the very broadest aspects of the invention, there is contemplated the possible employment of a flocculating means which is arranged with respect to the sedimentation basin so that the functioning effects of the flocculating means and of the sedimentation basin constitute that of a single unit; and according to an arrangement such as that just referred to, the flocculating means does not necessarily extend into the sedimentation basin but it does necessarily open or empty directly into such basin, whereby the advantageous effects of the combined parts enables a ready and efficient carrying out of a flocculation operation within the flocculating portion or section of the unit and a direct discharge of the flocculated liquid mixture into the sedimentation zone or section of the unit in an easy gentle manner that avoids disruption of the formed flocs to any substantial extent.

What is claimed is:

1. An apparatus for performing flocculation and sedimentation operations; which apparatus comprises, in combination, an open top sedimentation tank having a bottom with boundary walls extending upwardly therefrom and having a settled solids discharge section leading from the lower interior portion thereof; an influent supply means including a liquid-surrounded flocculation chamber structure wherein liquid having flocculatable solid material therein is received and from which the liquid with flocculated material suspended therein is ultimately delivered into the sedimentation zone of the tank; mechanically actuated paddles operable within the flocculation chamber structure for imparting to the liquid therein gentle, but positive, agitative effects conducive to floc coagmentation and amassment; an effluent launder for withdrawing supernatant liquid from the upper portion of a body of liquid undergoing sedimentation within the sedimentation zone and providing a means that determines the normal surface level of said body of liquid; and means operable over the bottom of the tank for mechanically impelling sedimented material to said settled solids discharge section; said flocculation chamber structure providing a flocculation section having substantial extent within the confines of the tank, occupying only a minor section of the upper surface portion of the body of liquor undergoing sedimentation, providing a floor portion immediately below the mechanically actuated paddles, but vertically spaced from the tank bottom, wherein there is realized the positive mechanical agitative effect of the paddles, and having discharge area providing constant hydraulic communication between the liquid undergoing flocculation in the flocculation chamber structure on the one hand and the body of liquid undergoing sedimentation within the sedimentation zone on the other hand whereby the level of the liquid undergoing flocculation is at all times substantially that of the level of the liquid undergoing sedimentation and whereby the liquid when flocculated within the chamber structure together with the flocculated material suspended therein can flow and drift freely, quietly and gently from said chamber structure through said discharge area and ultimately into the sedimentation zone.

2. An apparatus as defined in and by claim 1 according to which the mechanically actuated paddles are realized by mechanical agitators comprising two or more rotatable parallel horizontally-extending submerged shafts having horizontally extending paddles supported thereby and radially spaced therefrom and operable to substantially, horizontally, countercurrently and unobstructedly circulate a supply of previously formed flocs and throughout the liquid undergoing flocculation in the flocculation zone of the partially submerged flocculation chamber structure and in the region immediately over the floor defining portion of the flocculation chamber structure.

3. An apparatus as defined in and by claim 1 according to which mechanically actuated paddles operable in the partially submerged flocculation structure are provided by a mechanical agitator comprising a horizontally extending shaft having horizontally extending paddles supported thereby and radially spaced therefrom and operable in a flocculation section directly overlying a section of the bottom of the sedimentation tank but separated therefrom by and intermediate structural section constituting a floor portion of the flocculation section, also according to which the means operable over the bottom of the tank for mechanically impelling sedimented material to the settled solids discharge section of the tank comprises a rake carrying arm turnable about a vertically extending axis and movable through the space intermediate the underside of the bottom portion of the submerged flocculation chamber structure on the one hand and a corresponding underlying section of the bottom of the sedimentation tank on the other hand.

4. An apparatus as defined in and by claim 1 according to which the liquid with flocculated material suspended therein is delivered by, along, through, and from a horizontally extending trough portion of the submerged flocculation chamber structure into the central portion of the sedimentation zone of the sedimentation tank.

5. An apparatus as defined in and by claim 1 according to which the bottom of the liquid-surrounded flocculation chamber structure is provided with an apertured floor having a discharge area downwardly through which liquid with flocculated material suspended therein passes into the central portion of the sedimentation zone of the sedimentation tank.

6. An apparatus for performing flocculation and sedimentation operations which apparatus comprises, in combination, a sedimentation tank having a bottom with boundary walls extending upwardly therefrom, and having a settled solids discharge section; an influent supply means including as part thereof a horizontally extending flocculation trough which is normally partially submerged in the body of liquid undergoing sedimentation in the sedimentation zone of the tank, within which flocculation trough liquid with flocculatable material therein is received and horizontally along which said liquid flows preparatory to delivery of the liquid after flocculation into the sediminetation zone; mechanically actuated paddles operable within the trough for imparting to the liquid therein gentle, but positive, agitative effects conducive to floc coagmentation and amassment; an effluent launder for withdrawing supernatant liquid from the upper portion of the body of liquid undergoing sedimentation within the tank and providing a weir overflow that determines the normal level of the body of liquid in the sedimentation zone of the tank; and means operable over the bottom of the tank for mechanically impelling sedimented material to said solids discharge section; said flocculation trough having substantial extent within the area as marginally defined by the upstanding boundary wall of the tank but occupying within the sedimentation tank a space which is small as compared with that constituting the sedimentation zone within the tank, being constructed so as to provide a relatively horizontally extending passageway for liquid-solids mixture supplied therethrough, being defined as to a lower portion thereof by a submerged bottom member located directly over but in vertically spaced relationship in respect to a section of the tank bottom and at an elevation substantially below the level of the body of liquid undergoing sedimentation as determined by the effluent launder, providing a flocculation zone throughout which the functional effects of the mechanically actuated paddles extend, and having a discharge section providing constant hydraulic communication with the liquid undergoing flocculation operations within the flocculation zone on the one hand and the body of liquid undergoing sedimentation within the sedimentation zone on the other hand whereby the level of the liquid within the flocculation zone is substantially that of the level of the liquid undergoing sedimentation within the sedimentation zone and whereby the flocculated liquid and the flocculated material suspended therein flows and drifts freely, quietly and gently through said discharge section to and ultimately into the sedimentation zone.

7. An apparatus as defined in and by claim 6 according to which the partially submerged horizontally extending flocculation trough leads from the boundary wall of the sedimentation tank to a feedwell structure centrally disposed within the upper portion of the sedimentation tank, into which feedwell structure the liquid with flocculated solid material therein is received by horizontal flow from the flocculation trough and downwardly from which feedwell structure the liquid with flocculated material therein ultimately passes into the central section of the sedimentation zone within the sedimentation tank.

8. A unitary sedimentation apparatus, comprising a tank provided with an effluent outlet, a sediment-discharge outlet, travelling mechanism for impelling sediment as sludge to said discharge outlet, partial partition means dividing said tank into two horizontally-concentric functionally different sections of which the inner functions as a flocculation zone while the outer functions as a sedimentation zone, influent means for supplying incoming liquid to said flocculation zone, and flocculating bladed means operable in said flocculation zone movable in paths non-concentric with said sections for coagmenting suspended solids into settleable flocs, which said partial partition means because of being left partially open provides sufficient discharge area for the drifting and passage of floc-laden liquid from said flocculation zone to said sedimentation zone.

9. A liquid-treating apparatus, comprising a tank having a liquid-holding section in which the surface level of the liquid therein is normally maintained relatively constant; partial partition means comprising a wall portion and a submerged floor portion functionally dividing said tank into horizontally-concentric sections of which one provides an outer sedimentation zone extending the full depth of the liquid-holding section of the tank and one provides an inner flocculation zone having a depth less than that of the sedimentation zone and which zones are in constant hydraulic communication through a submerged passage area provided because of the partition being only a partial one and which passage area leads from a lower portion of the flocculation zone to the sedimentation zone; feed means for supplying incoming liquid to the flocculation zone; liquid agitating means comprising motivated blades disposed for functioning movements within the flocculation zone; outflow means for conducting clarified effluent from the sedimentation zone and having an overflow section that determines the normal surface level of the liquid within the tank; sediment discharge means leading from the lower portion of the tank; and sludge raking mechanism including a supporting member having a vertical axis and including motivated outwardly-extending members providing sludge-engaging elements turnable about said axis for impelling sediment from diverse sections of the tank bottom to said discharge means and of which outwardly-extending members some portions thereof have horizontal movement within a space immediately below a portion of said partial partition means.

10. Apparatus according to claim 9, in which said sludge raking mechanism comprises an upstanding pier entering said flocculation zone and disposed so that said motivated blades operate in the space between it and the wall portion of said partial partition means.

11. Apparatus for the flocculation and sedimentation of liquids, comprising a tank divided into hydraulically-communicating horizontally-concentric inner and outer zones of which the inner one is a flocculation zone, while the surrounding outer one is a sedimentation zone, liquid-feeding means by which incoming liquid is delivered into the flocculation zone, outflow means by which clarified effluent liquid is passed from the sedimentation zone, sediment-discharge means leading from the sedimentation zone, motivated raking means disposed for impelling sediment to said discharge means, motivated liquid-agitating means disposed for functioning within the flocculation zone and a fixed upstanding hollow structure in said tank, said motivated raking means including as a part thereof a rotatable structure encircling said fixed upstanding hollow structure.

12. Apparatus for the flocculation and sedimentation of liquids, comprising a tank, partial partition comprising a dividing wall portion and a submerged floor portion functionally dividing said tank into hydraulically-communicating horizontally-concentric zones of which one is a flocculation zone and one is a sedimentation zone, feed means for incoming liquid leading into the flocculation zone, outflow means for clarified effluent liquid leading from the sedimentation zone, sediment-discharge means leading from the sedimentation zone, motivated raking mechanism for impelling sediment to said discharge means, and motivated liquid-agitating means for the flocculation zone comprising travelling bladed elements operatively supported from the dividing wall portion of said partition.

13. Apparatus for the flocculation and sedimentation of liquids, comprising a tank, providing a liquid-holding section having a sediment discharge leading from the lower portion thereof; a liquid feeding means with a ported discharge section centrally disposed with respect to the marginal wall of the tank; effluent means having an overflow portion that determines the normal operative level of the liquid within the tank; partition means dividing said tank into two functionally different horizontally-concentric sections of which the inner provides a flocculation zone wherein the incoming liquid is initially received from said ported section and the outer of which provides a sedimentation zone, which partition means comprises an upwardly-extending dividing wall portion and a floor portion at an elevation above that of the main portion of the tank bottom and is left partially open to provide sufficient flow area leading from a lower portion of the flocculation zone to the sedimentation zone for permitting the submerged passing and drifting of liquid with floc suspended therein from the flocculation zone into the lower region of the sedimentation zone; motivated blade means operable in said flocculation zone within the horizontal section thereof between said ported discharge section and said dividing wall portion and serving for agitating the liquid and thereby coagmenting into settleable solids all flocculatable matter in the liquid; sludge raking mechanism having a supporting member providing a vertically-extending axis and having motivated outwardly-extending members with sludge-engaging elements turnable in horizontal paths about said axis for impelling sediment from diverse sections of the tank bottom to said sediment discharge outlet and of which outwardly-extending members some portions thereof have horizontal movement within the space immediately below at least the dividing wall portion of said partition means.

14. A flocculation and sedimentation unit, comprising in combination, a liquid-holding tank, an intermediate partitioning means functionally dividing the liquid-holding section and tank into horizontally-concentric inner flocculation and outer sedimentation zones that are in constant hydraulic communication through a sufficiently large total submerged discharge area to permit a flow and drift of displaced liquid with solids matter suspended therein from the flocculation zone into the sedimentation zone, liquid-supply means, upwardly-extending stationary structure constituting a part of said liquid supply means by providing a hollow upflow section terminating in a ported section from which the incoming liquid is initially delivered into the flocculation zone, outflow means determining the normal operative level within the tank and leading from the sedimentation zone of the tank, sediment-discharge means leading from the lower portion of the tank, and sediment-transfer mechanism turnable about a vertically-extending axis and comprising a horizontally-turnable arms-carrier deriving support from said upwardly-extending hollow structure, arms extending from said horizontally-turnable arms-carrier providing sediment-engaging elements disposed for impelling sedimented solids from diverse sections within the lower portion of said tank to said sediment-discharge means, and motivated liquid-agitating means comprising paddles functionally disposed for operating within the liquid-holding space left between the exterior of said horizontally-turnable arms-carrier on the one hand and the interior of said partitioning means on the other hand.

15. A flocculation and sedimentation unit, comprising in combination a liquid-holding tank having a bottom and an upstanding peripheral boundary wall, partial partitioning means comprising an intermediate partitioning wall portion functionally dividing the liquid-holding section of the tank into horizontally-concentric zones providing an inner flocculation zone wherein liquid is detained while being mechanically agitated and a surrounding sedimentation zone wherein conditions are maintained favorable to quiescent settling, said partial partitioning means being left with a sufficiently large total submerged discharge area by which there is provided not only constant hydraulic communication between the zones but also for a relatively free flow and drift of displaced liquid with suspended flocs therein from the inner flocculation zone to the surrounding sedimentation zone as and when incoming liquid is delivered into the inner flocculation zone, liquid-supply means arranged for delivering liquid to be treated into the inner flocculation zone, outflow means leading from the surrounding sedimentation zone of the tank arranged for determining the normal operative level within the tank at an elevation somewhat below that of the top margin of the intermediate partitioning wall portion but substantially above that of the lowermost margin of the intermediate partitioning wall portion, sediment-discharge means leading from the lower portion of the tank, motivated sludge-raking mechanism for impelling sedimented sludge from diverse sections of the tank bottom to said sediment-discharge means, and motivated liquid-agitating means comprising parallel horizontally-extending bladed elements operatively disposed within the liquid-holding section of the inner flocculation zone and carried so as to have operative movements within the liquid in directions transverse to their length.

16. A flocculation and sedimentation unit as defined in and by claim 15, according to which the motivated sludge-raking mechanism for impelling sedimented sludge comprises a vertically-extending horizontally-turnable arm-carrying section having extent within the central portion of the inner flocculation zone, and according to which the motivated liquid-agitating means comprises a plurality of sets of parallel horizontally-extending paddles, there being a set of paddles disposed in the space between one side of the horizontally-turnable vertically-extending arm-carrying section on the one hand and the interior of the intermediate partitioning wall portion on the other hand, while another set of paddles has similar disposition in the space between an opposite side of said arm-carrying section on the one hand and the interior of the intermediate partitioning wall portion on the other hand.

GEORGE M. DARBY.